Sept. 7, 1943.   I. D. FENWICK   2,329,039
TIRE AIR PRESSURE GAUGE
Filed Aug. 21, 1942

INVENTOR.
IVY D. FENWICK.
BY Ely + Pattison
ATTORNEYS

Patented Sept. 7, 1943

2,329,039

UNITED STATES PATENT OFFICE 2,329,039

TIRE AIR PRESSURE GAUGE

Ivy D. Fenwick, Brooklyn, N. Y.

Application August 21, 1942, Serial No. 455,631

2 Claims. (Cl. 73—110)

This invention relates to improvements in gauges, and more specifically to a gauge for indicating air pressure in an automobile tire.

One of the important features of the invention resides in a gauge which may be secured to a tire valve in lieu of the conventional valve cap to enable the exact instant reading of the amount of air pressure present in a tire, thus dispensing with the usual practice of removing the valve cap and applying a tire gauge to the valve.

Another feature of the invention is to provide a tire gauge which is screwed into sealing engagement with the threaded stem of a tire valve without alteration thereof to avoid leakage of air from a tire and which prevents accidental loss of air from a tire should the valve spring become weak or out of adjustment.

A further feature of the invention is the provision of a tire gauge which is relatively small in size and light in weight so as to be attached to a tire valve and remain thereon while the tire is rotating and not interfere with the balance of the tire.

A further feature of the invention is to provide a tire air pressure gauge as aforesaid, which is simple and inexpensive of construction, easy to attach and remove from a tire valve, and which is strong and durable to withstand the centrifugal force to which the gauge is subjected during use.

Other novel features of the invention will become apparent as the following specification is read in conjunction with the accompanying drawing, in which.

Figure 3:
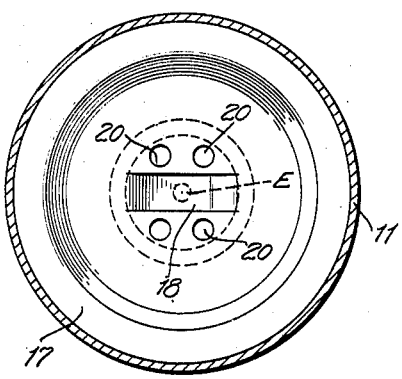
Figure 3 is a horizontal sectional view on the line 3—3 of Figure 2.

Referring to the drawing by reference characters, the numeral 10 designates my improved tire air pressure gauge in its entirety. The gauge 10 includes a cylindrical housing 11 which comprises an annular side wall 12 and an end wall 13. The end wall 13 is provided with an annular depression 14 which forms an annular peripheral shoulder 15. The end wall 13 is provided with a central air inlet opening and coaxial with the opening is an interiorly screw threaded nipple 16, said nipple being integral with the end wall 13. Seated in the depression 14 is a metal disk 17 which is complementary to the end wall and shoulder 15 so as to flatly rest thereon. Formed integral with the disk 17 and punched outwardly therefrom is a valve engaging member 18, the said member bridging the air inlet opening but not in any way preventing the passage of air through the said opening. Air inlets 19 are formed by the punching outwardly of the member 18 and the disk 17 is further provided with a series of air openings 20 as best illustrated in Figure 3.

Seated against the peripheral flange of the disk 17 is the peripheral portion of an annular flexible diaphragm 21. Abutting the peripheral portion of the diaphragm 21 is one end of an annular collar 22 which snugly fits within the annular wall 11 of the housing. Fitting against and abutting the other end of the collar 22 is a dial plate 24, the outer side of which is provided with graduations and indicia indicative of air pressure. Fitting against the outer side of the dial disk 24 is a relatively narrow annular collar 25, and which collar spaces a transparent lens 26 from the face of the dial disk 24. The spacer collars 22, 25, diaphragm 21, dial disk 24, and lens 26 are secured in tight sealed engagement by turning the outer end of the side wall 11 inwardly over and against a beveled or curved seat 27 provided about the periphery of the lens 26.

Journaled for rotation in the dial disk 24 is a cylindrical shell member 28, which extends in a direction toward the diaphragm 21 but terminates well short thereof. The shell member 28 is mounted axially with respect to the dial disk 24 and fixedly carries an indicating pointer 29 which is disposed in spaced relation with respect to the lens 26 and dial disk 24. The indicating pointer 29 moves about the dial disk 24 and cooperates with the air pressure indicia or graduations to indicate an air pressure reading of the gauge.

Secured axially of the diaphragm 21 and freely extending into the cylindrical shell member 28 is a stud 30, the exterior of which is provided with a spiral groove 31 into which a pin 32 extends, the said pin being fixedly carried by the shell member 28. A coiled expansion spring 33 encircles the shell member and has its ends respectively abutting the confronting sides of the dial disk 24 and the diaphragm 21.

Figure 1:
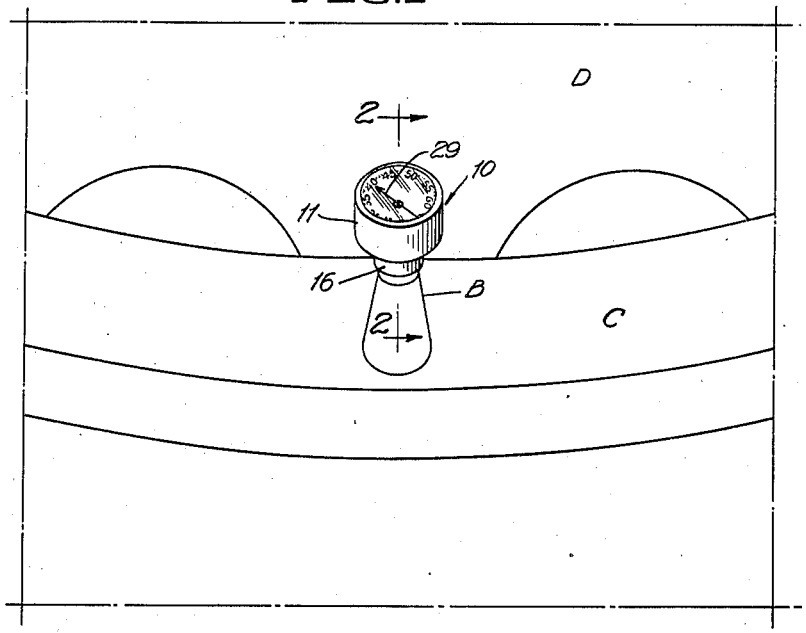
Figure 1 is a fragmentary perspective view of an automobile wheel illustrating the tire gauge in position upon the tire valve.
Figure 2:
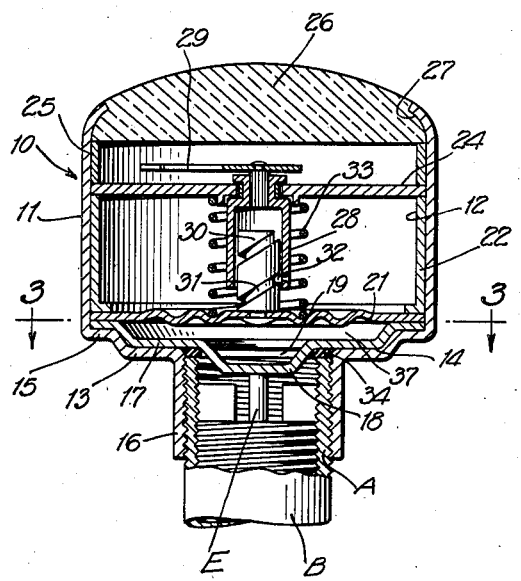
Figure 2 is an enlarged vertical sectional view on the line 2—2 of Figure 1.

In practice, the gauge 10 is applied to the threaded stem A of a tire valve B, the latter being shown in Figure 1 as extending from the rim C of an automobile wheel D. The conventional cap is removed from the stem A and the gauge 10 is substituted therefor. The threaded nipple 16 engages the threads of the stem A and for sealing the joint between the gauge and the stem A, a rubber washer 34 is interposed between the disk 17 and the end of the valve stem A. As the gauge is screwed onto the stem A, the member 18 engages and presses inwardly on the tire valve, thus causing air from the valve and the tire to which the valve is connected, to flow through the air inlet and into an air chamber 37 which is defined by the space between the diaphragm 21 and the disk 17. As the air enters the air chamber 37, the pressure flexes the diaphragm 21 which causes the diaphragm to move inwardly as does the stud 30. Inward movement of the stud 30 causes the pin 32 to move in the spiral groove, and accordingly turns the shell member 28 and the indicating pointer 29. The movement of the indicating member 29 is proportional to the amount of air pressure present in the air chamber 37, thus a reading of the air pressure of a tire may be determined by looking through the transparent lens 26 to view the indicating pointer 29 relative to the readings on the dial disk 24.

After the tire gauge 10 has been applied to the tire valve, it remains thereon whereby instant reading of the air pressure of the tire may be obtained without the necessity of removing a valve cap and applying a testing gauge to the valve. It will of course be understood that to inflate the tire, the gauge 10 is unscrewed from the threaded stem A of the tire valve, and after inflation, the gauge is again screwed into position upon the valve.

While I have shown and described what I consider to be the most practical embodiment of my invention, I wish it to be understood that such changes in construction and design as come within the scope of the appended claims may be resorted to if desired.

Having thus described the invention, what I claim as new and desire to secure by Letters Patent of the United States, is:

1. An air pressure gauge for attachment to a tire valve comprising a cylindrical casing open at its top and having a bottom wall, said bottom wall being provided with an air inlet opening coaxial with the axis of the cylindrical casing and an annular depression around the opening forming an annular shoulder adjacent the side wall of the casing, an internally screw threaded nipple extending outwardly from the bottom wall and coaxial with the air inlet opening, a disk plate of a size and shape conforming to that of the bottom wall and resting thereon, said disk plate having a struck out portion extending through the air inlet opening and into said nipple for engagement with a valve stem, said disk plate being provided with air passages in open communication with the interior of the nipple, a pressure responsive disk diaphragm having its peripheral portion resting on the peripheral portion of said disk plate whereby the main portion of the diaphragm is spaced from the disk plate, means for holding said diaphragm and disk plate seated against said annular shoulder of the bottom wall, a dial plate fixedly mounted in said casing adjacent the top open end thereof, a rotatable indicating pointer for movement over the top face of the dial plate, means associated with the diaphragm and rotatable indicating pointer for turning same upon flexing movements of the diaphragm, and a transparent glass fixedly mounted in the open end of the casing and closing the same.

2. An air pressure gauge for attachment to a tire valve comprising a cylindrical casing open at its top and having a bottom wall, said bottom wall being provided with an air inlet opening coaxial with the axis of the cylindrical casing and an annular depression around the opening forming an annular shoulder adjacent the side wall of the casing, an internally screw threaded nipple extending outwardly from the bottom wall and coaxial with the air inlet opening, a disk plate of a size and shape conforming to that of the bottom wall and resting thereon, said disk plate having a struck out portion extending through the air inlet opening and into said nipple for engagement with a valve stem, said disk plate being provided with air passages in open communication with the interior of the nipple, a pressure responsive disk diaphragm having its peripheral portion resting upon the peripheral portion of said disk plate whereby the main portion of the diaphragm is spaced from the disk plate, an annular spacer collar snugly fitting within said casing having its lower edge resting upon said diaphragm, a dial plate resting upon the top edge of said annular collar, a second annular spacer collar snugly fitting into said casing and resting upon the dial plate, a transparent glass seated on the top edge of the second mentioned collar, the top edge of the casing being rolled inwardly over the peripheral portion of the transparent glass, a rotatable indicating pointer for movement over the top face of the dial plate, and means associated with the diaphragm and rotatable indicating pointer for turning same upon flexing movements of the diaphragm.

IVY D. FENWICK.